United States Patent
O'Connor et al.

(10) Patent No.: US 6,952,754 B2
(45) Date of Patent: Oct. 4, 2005

(54) PREDECODE APPARATUS, SYSTEMS, AND METHODS

(75) Inventors: Dennis M. O'Connor, Chandler, AZ (US); Stephen J. Strazdus, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 10/336,847

(22) Filed: Jan. 3, 2003

(65) Prior Publication Data

US 2004/0133764 A1 Jul. 8, 2004

(51) Int. Cl.⁷ .............................................. G06F 12/00
(52) U.S. Cl. ...................... 711/125; 711/156; 712/213; 712/229
(58) Field of Search .............................. 711/125, 156; 712/229, 213

(56) References Cited

U.S. PATENT DOCUMENTS

| | | | | | |
|---|---|---|---|---|---|
| 3,736,566 | A | * | 5/1973 | Anderson et al. ............. 714/15 |
| 5,335,331 | A | * | 8/1994 | Murao et al. ................ 712/213 |
| 5,809,273 | A | * | 9/1998 | Favor et al. ................. 712/210 |
| 5,826,053 | A | * | 10/1998 | Witt ............................ 712/210 |
| 5,970,235 | A | * | 10/1999 | Witt et al. .................... 712/213 |
| 6,085,314 | A | * | 7/2000 | Asghar et al. .............. 712/213 |
| 6,539,470 | B1 | * | 3/2003 | Mahurin et al. ............ 712/208 |
| 6,598,154 | B1 | * | 7/2003 | Vaid et al. ................... 712/237 |
| 2002/0004897 | A1 | * | 1/2002 | Kao ............................ 712/227 |

* cited by examiner

*Primary Examiner*—Matthew D. Anderson
(74) *Attorney, Agent, or Firm*—Schwegman, Lundberg, Woessner & Kluth, P.A.

(57) ABSTRACT

An apparatus and a system may include a modal property indicator and an access module to receive the modal property indicator and to access a selected location based on a condition of the modal property indicator. An article may include data, which, when accessed, results in a machine performing a method including indicating a processor mode to a memory including a plurality of instructions and pre-decoding an instruction selected from the plurality of instructions according to the processor mode.

20 Claims, 2 Drawing Sheets

PREDECODE APPARATUS, SYSTEMS, AND METHODS

TECHNICAL FIELD

Embodiments of the invention relate generally to apparatus, systems, and methods used to decode and execute instruction sets, including those accessed by processors.

BACKGROUND INFORMATION

An instruction cache sometimes stores predecoded instructions defined by an internal instruction set architecture (ISA), which may differ substantially from the standard instruction set (e.g., assembly language) a programmer uses to direct the operations of a processor. For example, the instructions in the cache may have additional bits with meanings not found in the standard instructions. In some systems, these additional bits may be derived from the bits present in the instruction itself; in others, from the address of the instructions.

When an access causes a cache miss, a request for a block of memory containing the instructions is sent to the memory system (which may include other caches). As the requested block of memory is returned, it passes through predecode logic that transforms the included instructions to an internal, predecoded form.

Some ISAs permit operation in a number of different modes, wherein each mode is associated with a potentially different set of transforms in the predecode logic. Examples include the Thumb® and ARM® instruction sets that are part of the XScale™ technology available from Intel Corporation of Santa Clara, Calif. In some modes the instructions sent to the predecoder are of a different width than in other modes, which can create implementation problems.

For example, since 16-bit Thumb® instructions may be predecoded into the same internal ISA used by 32-bit ARM® instructions, a block of internal-format instructions derived from a particular block of Thumb® instructions may require twice the space of the internal-format instructions derived from the same size block of ARM® instructions. It is also possible for both ARM® or Thumb® instructions to reside in any block of memory larger than 6 bytes, which means that a block of instructions fetched from memory may be a mix of both ARM and Thumb instructions. Therefore, determining which predecoder to use for a cache fill may not be feasible by simply analyzing data returned from the memory system, or knowing from where in the memory system the data was returned. Finally, some instructions can only be executed in privileged modes. Installing additional privilege-checking logic to determine the existence of illegally-fetched instructions may enlarge the execution pipeline, slowing execution speed and increasing power usage.

DETAILED DESCRIPTION

In the following detailed description of various embodiments of the invention, reference is made to the accompanying drawings that form a part hereof, and in which are shown by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Figure 1:
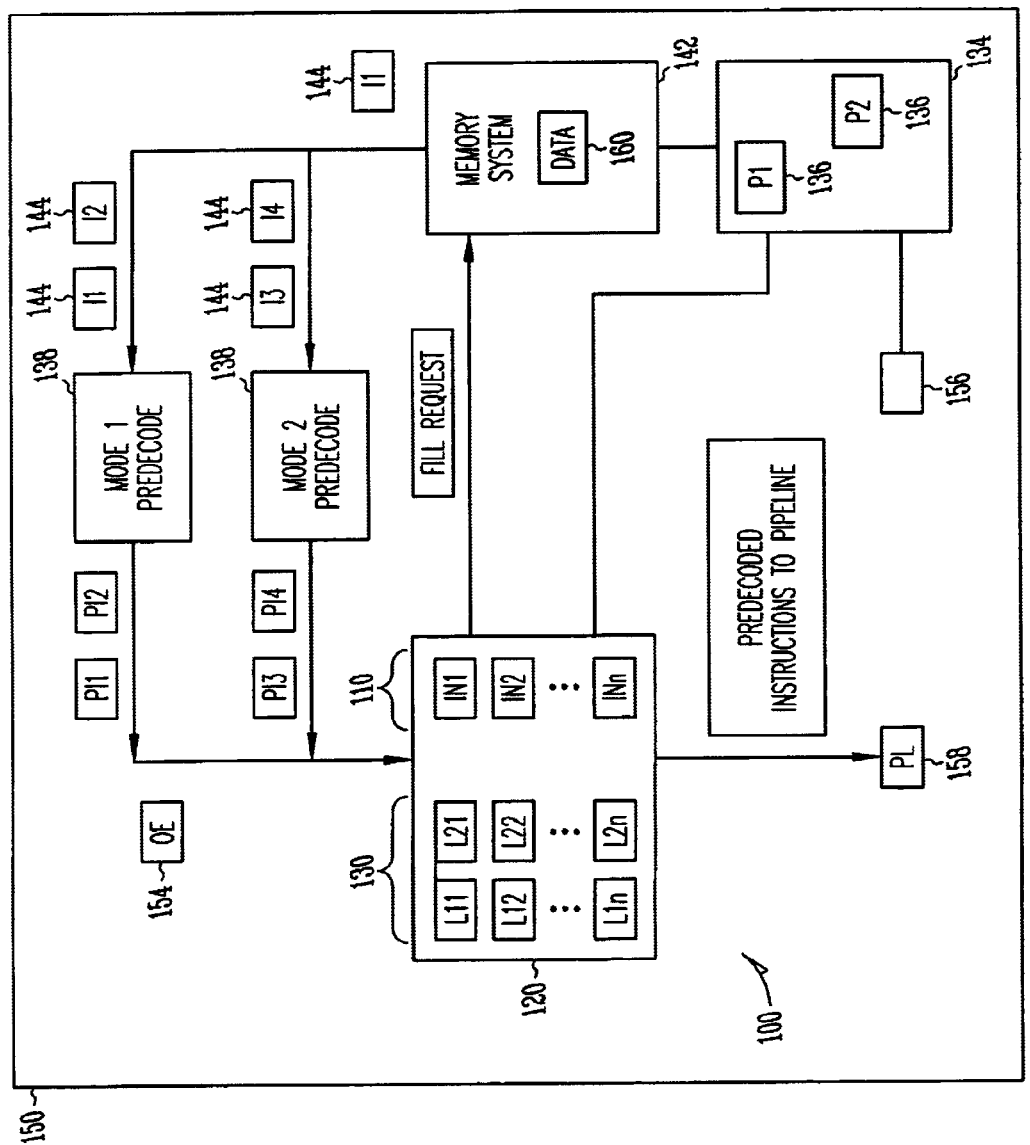
FIG. 1 is a block diagram of an apparatus, an article including a machine-accessible medium, and a system according to various embodiments of the invention.

FIG. 1 is a block diagram of an apparatus, an article including a machine-accessible medium, and a system according to various embodiments of the invention. An apparatus 100, may include one or more modal property indicators 110, such as a cache tag, a memory location, a flag, or a register, as well as an access module 120, such as a cache, which is capable of operating to receive or maintain the modal property indicator 110 and to access one or more selected locations 130 based on a condition of the modal property indicator 110. The locations 130 may be memory locations, registers, or any other module, device, or object capable of storing data.

For example, the indicator 110 may indicate an operational mode of a processor 134, such as one or more mutually coupled processors 136 (e.g., master-slave processors 136, or co-processors 136, either resident within the same chassis or card, or separated, and communicating via carrier wave and/or a network). The apparatus may also include one or more predecoders 138 capable of being communicatively coupled to the access module 120 and a memory system 142. The predecoders are capable of predecoding one or more instructions 144 included in a plurality of instructions according to the associated modal property indicator 110.

If one of the processors 136 operates using some versions of the ARM® architecture, then the indicators 110 might operate to indicate such modes as the ARM® user, system, supervisor, and abort modes; the various ARM® interrupt modes, such as the fast interrupt (FIQ) mode and the normal interrupt (IRQ) mode; the Thumb® mode; and the Java™ mode. For example, indicator IN1 may be used to indicate a first mode of operation (e.g., one of the ARM® modes) and to access location L11 within access module 120. Indicator IN2 may be used to indicate a second mode of operation (e.g., the Thumb® mode) and to access location L21.

To continue the example, the modal property indicator IN1 may be associated with the instructions I1 and I3, and the modal property indicator IN2 may be associated with the instructions I2 and I4. The MODE1 predecoder 138 may be used to predecode instructions I1 and I3 to generate predecoded instructions PI1 and PI2, while the MODE2 predecoder 138 may be used to predecode instructions I2 and I4 to generate predecoded instructions PI3 and PI4, respectively.

Thus it can be seen that the selected location to be accessed in the access module 120 can include a physical register (or memory location) L11 included in a first set of registers (or memory locations) L11 . . . L1n if the indicator IN1 condition comprises a first state, and a second physical register (or memory location) L21 included in a second set of registers (or memory locations) L21 . . . L2n if the condition of the indicator IN1 comprises a second state. In this fashion, when the instruction set of one mode has a first bit width, and the instruction set of another mode has a second bit width, the MODE1 predecoder 138 may operate to generate a first internal address space L11 . . . L1n which is different from a second internal address space L21 . . . L2n generated by the MODE2 predecoder 138. For example, in the case of an ARM® mode having 32-bit wide instructions, and a Thumb® mode having 16-bit wide instructions, every four bytes of Thumb® instructions (i.e., two Thumb® instructions) may be translated by the MODE2 predecoder 138 into twice as many bytes of predecoded instructions as would four bytes of ARM® instructions (e.g., one ARM® instruction) by the MODE1 predecoder 138.

As shown in FIG. 1, in some embodiments, a system 150 may comprise a first processor P1 including a cache 120 including a cache tag IN1 capable of indicating a first processor mode and a second processor mode selected from a plurality of processor modes associated with the first processor P1. The system 150 may also include one or more predecoders 138, each associated with one or more of the processor P1 modes and capable of being communicatively coupled to the cache 120. The predecoders may comprise separate modules, or several predecoders may be included in a single, integrated module, as desired. The system may also include any number of other processors, such as a second processor P2, capable of being communicatively coupled to the first processor. In some embodiments, one or more of the predecoders 138 may be capable of detecting an illegal instruction 144 and translating the illegal instruction 144 into an opcode exception instruction 154. In some embodiments, the system 150 may also include a wireless communication device 156, such as a transmitter, receiver, or transceiver capable of being communicatively coupled to the processor 134.

The cache 120 may be a predecoded instruction cache 120, possibly coupled to a pipeline 158. The cache 120 may include a memory 110 capable of being communicatively coupled to the cache and receiving an indication of one or more of the modes implemented by the processors 136.

The indicators IN1, IN2, . . . , INn, instructions I1 . . . I4, predecoded instructions PI1 . . . PI4, locations (memory locations or registers) L11 . . . L1n and L21 . . . L2n, illegal instruction II, apparatus 100, indicators 110, access module 120, cache 120, locations 130, processor 134, coupled processors 136, predecoders 138, memory system 142, system 150, and wireless communication device 156 may all be characterized as "modules" herein. Such modules may include hardware circuitry, and/or processors and/or memory circuits, software program modules, and/or firmware, and combinations thereof, as desired by the architect of the apparatus 100 and the system 150, and as appropriate for particular implementations of various embodiments of the invention.

It should also be understood that the apparatus and systems of various embodiments of the invention can be used in applications other than those including cached memories, and other than for systems that include pipelined processors, and thus, embodiments of the invention are not to be so limited. The illustrations of an apparatus 100 and a system 150 are intended to provide a general understanding of the structure of various embodiments of the invention, and they are not intended to serve as a complete description of all the elements and features of apparatus and systems that might make use of the structures described herein.

Applications which may include the novel apparatus and systems of various embodiments of the invention include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 2:
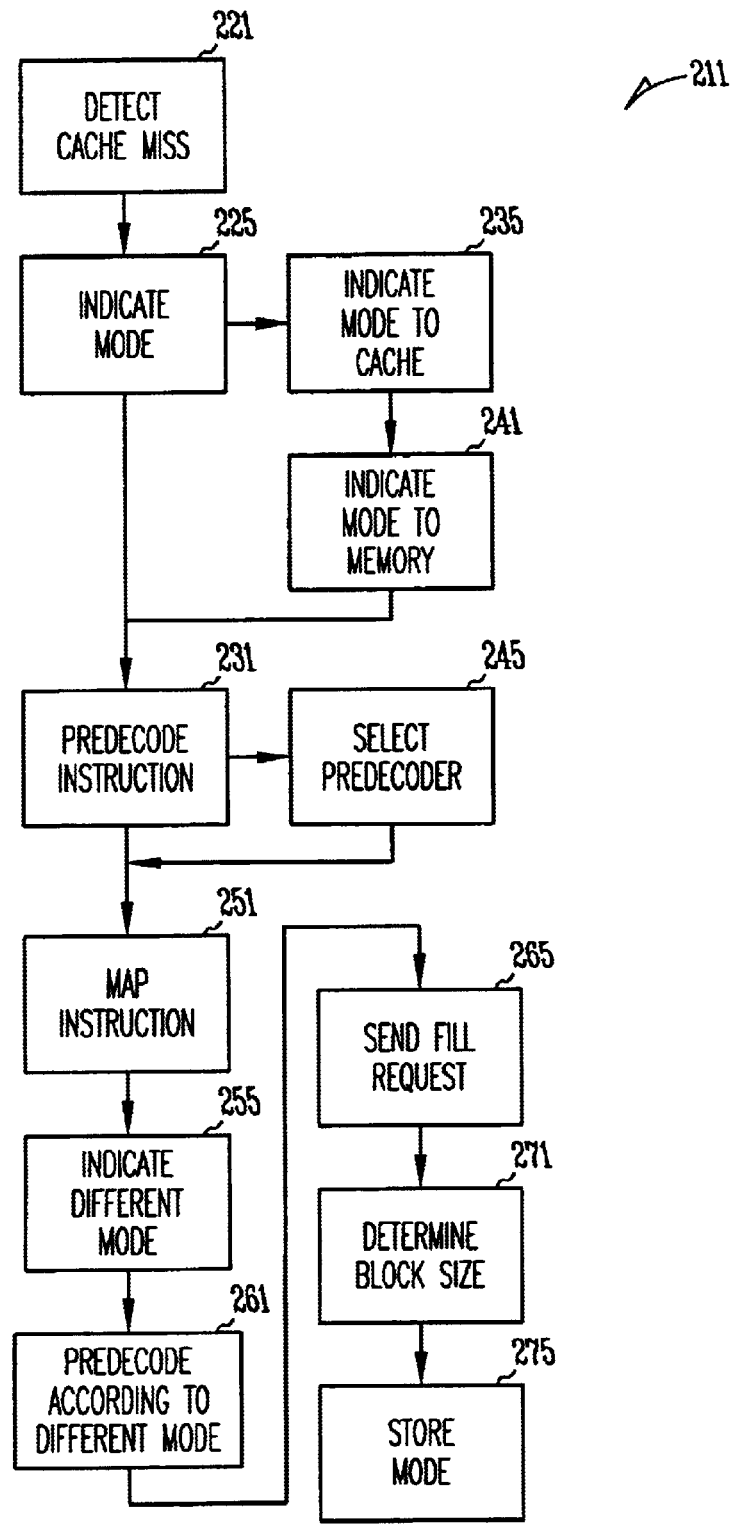
FIG. 2 is a flow chart illustrating several methods according to various embodiments of the invention.

FIG. 2 is a flow chart illustrating several methods according to various embodiments of the invention. In some embodiments, the method 211 may begin at block 221 with detecting a cache miss upon attempting to access a predecoded instruction in a cache when the processor mode is different than another processor mode used to create the predecoded instruction.

The method 211 may continue at block 225 with indicating a processor mode to a memory including a plurality of instructions, and predecoding an instruction selected from the plurality of instructions according to the processor mode to provide a predecoded instruction at block 231. Indicating the processor mode to the memory may further include indicating the processor mode to the cache at block 235, and/or sending the processor mode to the memory in conjunction with a cache fill request at block 241. Alternatively, instead of sending the mode to the memory with the cache fill, the mode may be retained within the cache, and re-associated with the cache fill when it returns. In either case, the mode indicated when the cache miss occurs is supplied with the data requested by the cache miss when that data is presented to the predecoders at block 231. Predecoding an instruction selected from the plurality of instructions according to the processor mode may include selecting a predecoder based on the processor mode at block 245.

The method 211 may also include several other activities, or variations on the activities noted above, such as indicating a processor mode selected from a plurality of modes to a memory including a plurality of instructions, wherein a first set of instructions included in the plurality of instructions corresponds to the processor mode, and predecoding an instruction selected from the first set of instructions according to the processor mode to provide a predecoded instruction, as well as mapping the predecoded instruction to a line in the cache selected from a plurality of lines based on the processor mode at block 225, 231, and 251. It should be noted that the processor mode may be indicated according to one or more resources that can be accessed in the selected mode, which instructions can legally be processed in the selected mode, and/or the width of instructions in the selected mode, among others.

The method 211 may also include indicating a different processor mode selected from a plurality of modes to the memory, wherein a second set of instructions included in the plurality of instructions corresponds to the different processor mode at block 255, and predecoding an instruction selected from the second set of instructions according to the different processor mode to provide a different predecoded instruction at block 261. Further, the method may include sending a cache fill request associated with a block of memory at block 265, determining a size of the block of memory based on the processor mode at block 271, and storing the processor mode in a cache tag associated with a predecoding mode applied to the predecoded instruction at block 275.

It should be noted that the methods described herein do not have to be executed in the order described, or in any particular order. Moreover, various activities described with respect to the methods identified herein can be executed in serial or parallel fashion. Information, including parameters, commands, operands, and other data can be sent and received in the form of one or more carrier waves.

Thus, referring back to FIG. 1, it is now easily understood that another embodiment of the invention may include an article 150, such as a computer, a memory system, a magnetic or optical disk, some other storage device, and/or any type of electronic device or system, comprising a machine-accessible medium such as a memory 142 (e.g., a memory including an electrical, optical, or electromagnetic conductor) having associated data 160 (e.g. computer program instructions), which when accessed, results in a machine performing such actions as indicating a processor mode selected from a plurality of modes to a memory including a plurality of instructions, wherein a first set of instructions included in the plurality of instructions corresponds to the processor mode; and predecoding an instruction selected from the first set of instructions according to the processor mode to provide a predecoded instruction.

Other activities may include indicating a different processor mode selected from a plurality of modes to the memory, wherein a second set of instructions included in the plurality of instructions corresponds to the different processor mode; and predecoding an instruction selected from the second set of instructions according to the different processor mode to provide a different predecoded instruction. Further activities may include sending a cache fill request associated with a block of memory; and determining a size of the block of memory based on the processor mode; as well as storing the processor mode in a cache tag associated with a predecoding mode applied to the predecoded instruction.

Although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein, will be apparent to those of skill in the art upon reviewing the above description.

The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method, comprising:
   indicating a processor mode to a memory containing a plurality of predecoded instructions;
   storing the processor mode in the memory; and
   selecting a predecoded instruction from the plurality of predecoded instructions according to the processor mode.

2. The method of claim 1, further comprising:
   detecting a cache miss upon attempting to access the predecoded instruction in a cache when the processor mode is different than another processor mode used to create the predecoded instruction.

3. The method of claim 1, wherein indicating the processor mode to the memory further includes:
   sending the processor mode to another memory in conjunction with a cache fill request.

4. The method of claim 3, wherein selecting a predecoded instruction further includes:
   selecting a predecoder based on the processor mode.

5. The method of claim 1, further comprising:
   indicating the processor mode to a cache.

6. The method of claim 5, further comprising:
   mapping the predecoded instruction to a line in the cache selected from a plurality of lines based on the processor mode.

7. The method of claim 1, wherein the processor mode is indicated according to at least one of resources that can be accessed, instructions that can legally be processed, and a width of an instruction.

8. An article comprising a machine-accessible medium having associated data, wherein the data, when accessed, results in a machine performing:
   indicating a processor mode selected from a plurality of modes to a memory containing a plurality of instructions, wherein a first set of predecoded instructions included in the plurality of instructions corresponds to the processor mode;
   storing the processor mode in the memory; and
   selecting a predecoded instruction from the first set of predecoded instructions according to the processor mode.

9. The article of claim 8, wherein the machine-accessible medium further includes data, which when accessed by the machine, results in the machine performing:
   indicating a different processor mode selected from a plurality of modes to the memory, wherein a second set of instructions included in the plurality of instructions corresponds to the different processor mode; and
   selecting a predecoded instruction from the second set of instructions according to the different processor mode.

10. The article of claim 8, wherein the machine-accessible medium further includes data, which when accessed by the machine, results in the machine performing:
    sending a cache fill request associated with a block of memory; and
    determining a size of the block of memory based on the processor mode.

11. The article of claim 8, wherein the machine-accessible medium further includes data, which when accessed by the machine, results in the machine performing:
    storing the processor mode in a cache tag associated with a predecoding mode applied to the predecoded instruction.

12. An apparatus, comprising:

a processor to provide a modal property indicator indicating a processor mode; and a memory to receive and store the modal property indicator and to access a selected location including a predecoded instruction based on a condition of the modal property indicator.

13. The apparatus of claim 12, wherein the modal property indicator is a cache tag, and wherein the memory comprises a cache having a plurality of predecoded instructions associated with a plurality of indications provided by the modal property indicator.

14. The apparatus of claim 12, further comprising:

a predecoder capable of being communicatively coupled to the memory and a memory system, wherein the predecoder is capable of predecoding an instruction included in a plurality of instructions according to the condition of the modal property indicator.

15. The apparatus of claim 12, wherein the selected location includes a physical register included in a first set of registers if the condition comprises a first state, and wherein the selected location includes a second physical register included in a second set of registers if the condition comprises a second state.

16. The apparatus of claim 12, wherein the selected location includes a first physical memory location included in the memory if the condition comprises a first state, and wherein the selected location includes a second physical memory location included in the memory if the condition comprises a second state.

17. A system, comprising:

a processor coupled to a cache having a cache tag to indicate a first processor mode and a second processor mode selected from a plurality of processor modes associated with the processor;

a first predecoder associated with the first processor mode and capable of being communicatively coupled to the cache;

a second predecoder associated with the second processor mode and capable of being communicatively coupled to the cache; and a wireless communication device capable of being communicatively coupled to the processor.

18. The system of claim 17, wherein the first predecoder is capable of detecting an illegal instruction and translating the illegal instruction into an opcode exception instruction.

19. The system of claim 17, wherein the cache is a predecoded instruction cache, further comprising:

a memory capable of being communicatively coupled to the cache and receiving an indication of the first processor mode.

20. The system of claim 17, wherein the first predecoder operates to generate a first internal address space different from a second internal address space generated by the second predecoder.

* * * * *